United States Patent [19]
Kazecki et al.

[11] Patent Number: 5,195,106
[45] Date of Patent: Mar. 16, 1993

[54] METHOD FOR CHANNEL ADAPTIVE DETECTING/EQUALIZE

[75] Inventors: Henry L. Kazecki, Arlington Heights; Steven H. Goode, Barrington; Donald W. Dennis, Schaumburg; James C. Baker, Hanover Park; Kevin L. Baum, Hoffman Estates; Bruce D. Mueller, Schaumburg, all of Ill.

[73] Assignee: Motorola, Inc., Schaumburg, Ill.

[21] Appl. No.: 612,656

[22] Filed: Nov. 14, 1990

[51] Int. Cl.$^5$ .............................................. H03H 7/30
[52] U.S. Cl. ...................................... 375/12; 333/18; 364/724.2
[58] Field of Search ................... 375/11, 12, 14, 18, 375/102; 333/18, 28 R; 364/724.19, 724.2

[56] References Cited
U.S. PATENT DOCUMENTS

4,021,738  5/1977  Gitlin et al. .......................... 375/14
4,805,191  2/1989  Burch et al. ........................... 375/11
5,065,410  11/1991 Yoshida et al. ........................ 375/12

Primary Examiner—Stephen Chin
Attorney, Agent, or Firm—Kenneth W. Bolvin

[57] ABSTRACT

In a communications device, two coherent detection algorithms (102 and 103), one of which has a decision feedback equalizer (103), and a detector selection algorithm (104) are used to dynamically select a detector depending on whether delay spread distortion is present. First the correlation of the detector without the equalizer (102) is measured. If this correlation is greater than a predetermined threshold, the data from that detector (102) is used by the communications device. If the correlation is less than the threshold, the correlation of the detector with the equalizer (103) is measured. If this is less than the correlation of the detector without the equalizer (102), the data from the detector without the equalizer (102) is used, otherwise the data is taken from the equalizer (103).

20 Claims, 6 Drawing Sheets

CE_EQU= CORRELATION FOR DETECTOR W/EQUALIZER
CE_DD= CORRELATION FOR DETECTOR(S) W/O EQUALIZER

METHOD FOR CHANNEL ADAPTIVE DETECTING/EQUALIZE

FIELD OF THE INVENTION

The present invention relates generally to communication devices in a time varying propagation environment.

BACKGROUND OF THE INVENTION

Figure 14:
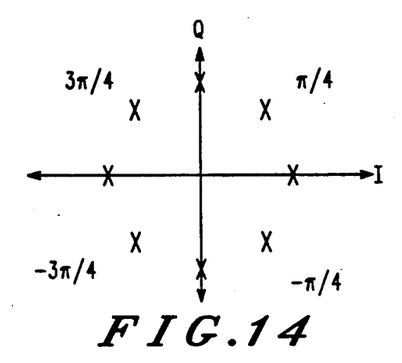
FIG. 14 shows the eight point constellation for a recovered signal.

Any modulation method can be represented by a constellation. An example of this is the eight point constellation illustrated in FIG. 14. This constellation is generated from differentially encoded QPSK (DEQPSK or π/4 QPSK) which is a subset of the four state QPSK constellation. Each state is characterized by a vector having the same magnitude, but a different phase angle. In a Rayleigh faded channel, the constellation has continuous but slowly varying, with respect to the data rate, amplitude and phase modulation imposed on it. A coherent detector has the ability to track the phase modulation and cancel it, generating the original eight point constellation. Although the envelope or amplitude modulation still remains imposed on the signal, it is not a problem for data recovery since all the data information is contained in the phase shifts.

In a delay spread field, the channel has the same characteristics but the amount of distortion is increased due to the delayed versions of the signal adding at the receiver input with their own uncorrelated Rayleigh fading statistics. This fading can be caused by a transmitted signal bouncing off a tall building or other structure. This condition is typically referred to as multipath distortion or delay spread distortion. This type of distortion results in a frequency null or notch in the spectrum of the modulation that severely degrades the performance of the communication system.

Coherent detectors are typically used in digital communications for the symbol decision process. Coherent detection is described in BERNARD SKLAR, DIGITAL COMMUNCATIONS, FUNDAMENTALS AND APPLICATIONS, Chapter 3 (1988). In a delay spread distortion environment, however, a detector alone cannot remove the distortion caused by the same signal being received at multiple times. This type of detection requires a detector with a channel equalizer. A typical channel equalizer structure is the decision feedback equalizer (DFE). The DFE can phase track and cancel the distortion caused by the delayed version of the signal. Once the distortion is cancelled, the eight point constellation is generated at the detector output. DFEs are described in JOHN PROAKIS, DIGITAL COMMUNICATIONS, Chapter 6 (1989). The channel equalizer, however, should not be used in an environment without delay spread distortion as it can cause sensitivity degradation compared to a coherent detector without the equalizer. There is a resulting need for a coherent detection algorithm that works equally well in an environment with and without delay spread distortion.

SUMMARY OF THE INVENTION

The present invention is comprised of two coherent detection algorithms, one of which has a decision feedback equalizer, and a detector selection algorithm. The process of the present invention is comprised of the steps of first measuring the correlation of the detector without the equalizer. If this correlation is greater than a predetermined threshold, the data from that detector is used by the communications device. If the correlation is less than the threshold, the correlation of the detector with the equalizer is measured. If this is less than the correlation of the detector without the equalizer, the data from the detector without the equalizer is used, otherwise the data is taken from the equalizer.

DETAILED DESCRIPTION OF THE PREFERRED EMBODIMENT

The different coherent detectors of the present invention enable relatively distortion-free operation of a digital communication device in environments with and without delay spread distortion on the communication channel. By using multiple coherent detection algorithms, one having a channel equalizer, the detector with the highest constellation correlation can be used.

Figure 1:
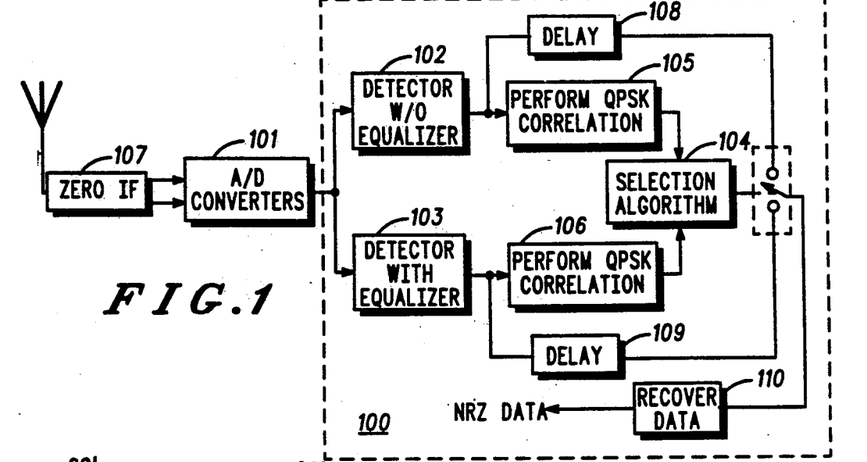
FIG. 1 shows the preferred embodiment of the present invention.
Figures 2, 3:
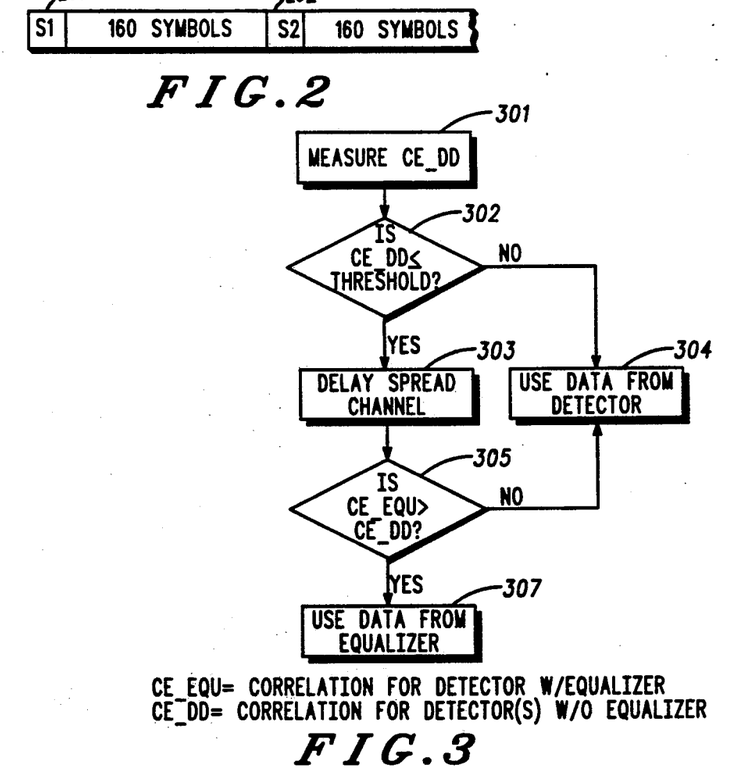
FIG. 2 shows the symbol format of the data input to the detectors.
FIG. 3 shows a flowchart of the present invention.

As illustrated in FIG. 1, the preferred embodiment of the present invention is comprised of two coherent detectors (102 and 103) coupled to the outputs of A/D converters (101). There are two A/D converters (101) that are fed from two separate outputs from the Zero IF receiver (107). The data output format of the A/D converters (101) that is fed into each detector (102 and 103), illustrated in FIG. 2, is in a series of frames of 160 symbols each, each frame having an initial sync sequence (201 and 202). Each detector (102 and 103) has a separate path to the A/D converters (101) and one of the detectors (102 and 103) has a decision feedback equalizer (DFE) algorithm (103). The detectors (102 and 103) provide correlation information (105 and 106) to a selection algorithm (104) that determines which detector output is to be used.

The selection algorithm (104) is based on the quadriphase shift keying (QPSK) signal constellation correlation between the coherently detected constellation points and a valid eight-point QPSK constellation. The signal constellation corresponds to differentially encoded QPSK (DEQPSK or π/4 QPSK) which is a subset of the four state QPSK constellation. Of course, if an alternate modulation method were used, a signal constellation correlation could be obtained relating to that form of modulation. A quality factor is determined by allowing each detector to accumulate a QPSK constellation correlation history for a number of symbols. The number of points chosen to be in the correlation history is a trade-off decision. If the number of estimates used in the averaging process is too small, the correlation estimate becomes noisy. By increasing the length of the estimate, the contribution to the error signal due to noise is reduced. Also, since the channel is dynamically changing, the individual detectors will reflect this in terms of their performance. If too much averaging is used, the switch will be based on past estimates that do not apply to the present performance of the individual detectors as the channel changes and switching errors become more likely. So the choice of the window length should be based upon the channel conditions encountered.

The amount of delay in the delay blocks (108 and 109) depends on the length of the QPSK correlation history. If the correlation history is chosen to be one frame, then the delay would be 160 symbol times. If a switch selection is made N times per frame, then the delay would be 160/N symbol times. It is also conceivable to make a switch selection based on a constellation history over a plurality of past frames.

The decision on whether to use the limited output of the coherent detector is done in the following manner. The output of the coherent detector without the equalizer (102) is defined as $v_d(t)$ and the detector with the equalizer (103) is defined as $v_e(t)$. The detected output of the the first detector is therefore represented by $\hat{v}_d(t)$ and the latter by $\hat{v}_e(t)$. Now let $$C_d(t) = E\{v_d(t)\hat{v}_d^*(t)\}$$

$$C_e(t) = E\{v_e(t)\hat{v}_e^*(t)\}$$

where $C_d$ and $C_e$ are the correlation functions between the detected DEQPSK constellation points and the actual received signal and $E\{\}$ denotes the ensemble average. The above true correlations can be estimated from a finite length data sequence:

$$\widetilde{C_d(t)} = \frac{1}{N_0 - P} \sum_{n=P+1}^{N_0} v_d(n)\hat{v}_d^*(n - t)$$

$$\widetilde{C_e(t)} = \frac{1}{N_0 - P} \sum_{n=P+1}^{N_0} v_e(n)\hat{v}_e^*(n - t)$$

where $N_0$ represents the window length (number of past samples to use in the average), P represents the correlation estimate generated for the current symbol, and $\hat{v}^*$ is the complex conjugate of $\hat{v}$. This conjugation produces a subtraction in terms of the phase angle between two complex numbers.

A channel that has only Rayleigh fading has a $\widetilde{C_d}(t)$ that is close to unity and a $\widetilde{C_e}(t)$ that is lower than the $\widetilde{C_d}(t)$ even though both $v_d(t)$ and $v_e(t)$ have low distortion. This is due to an inherent sensitivity loss in the equalizer when a Rayleigh channel is encountered. A channel that has delay spread distortion has a distorted $v_d(t)$ and a $v_e(t)$ with very little distortion due to the equalizer. This results in a larger $C_e(t)$ than $C_d(t)$, showing a high degree of correlation between the valid DEQPSK constellation and the signal from the equalizer. The detector selection algorithm (104), therefore, will select the $v_d(t)$ output when a Rayleigh channel is encountered and the $v_e(t)$ output when a delay spread channel is encountered.

The selection process is illustrated in FIG. 3. This process uses a threshold, a typical value being 0.975, that is a means by which the switch can be biased towards the coherent detector, without the equalizer, in flat fading. Although the equalizer has a sensitivity loss associated with it in flat fading, it still performs adequately to occasionally fool the switch into thinking that it is performing equally to the coherent detector. By biasing the switch toward the coherent detector, the performance of the switch converges towards the coherent detector's performance curve in flat fading while its delay spread performance remains unchanged. The reason for this is that the coherent detector is always working below the threshold in the delay spread environment. The correlation of the detector is first tested (301). If this correlation is less than or equal to the threshold (302), a channel with delay spread distortion is indicated (303). If this correlation is greater than the threshold, a normal Rayleigh channel exists and data is taken from the detector without the equalizer (304). If a channel with delay spread distortion is present, a test is done to determine if the distortion is enough to warrant taking the data from the equalizer (305). If the correlation for the equalizer is greater than the correlation for the detector, data is taken from the equalizer (307). Otherwise, the distortion is so slight that the data is taken from the detector (304).

Figure 4:
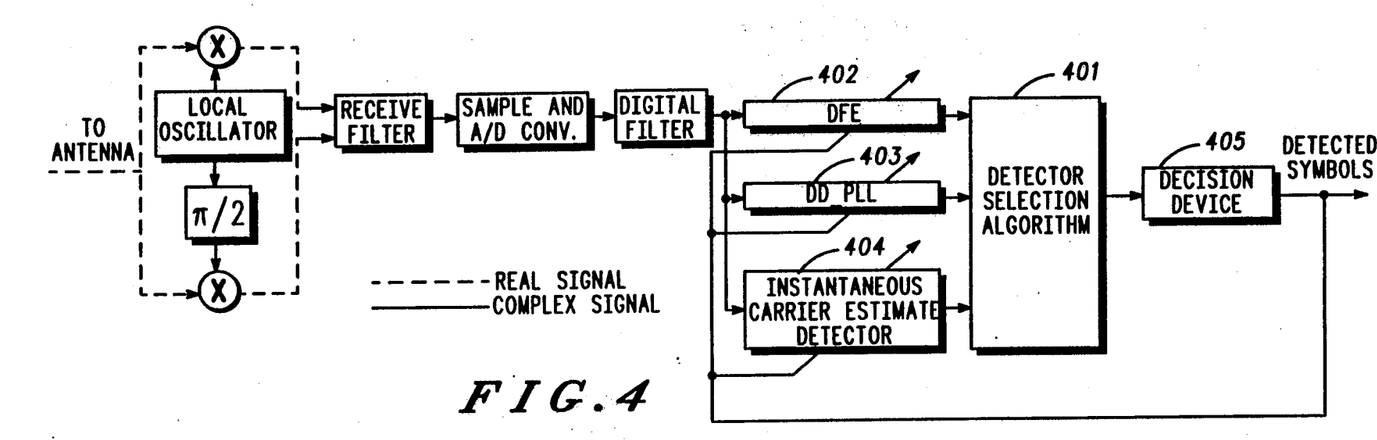
FIG. 4 shows an alternate embodiment of the present invention process.
Figure 5:
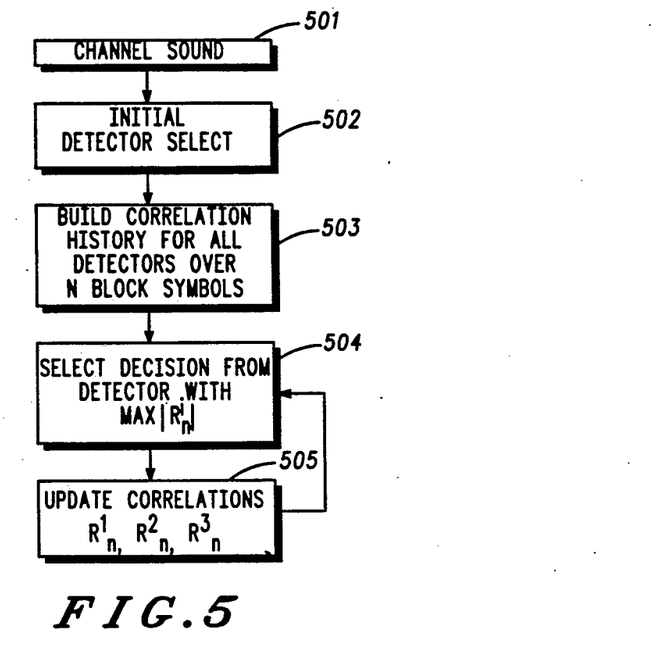
FIG. 5 shows a flowchart in accordance with the alternate embodiment of FIG. 4.

An alternate embodiment of the present invention is illustrated in FIG. 4. This embodiment uses three QPSK detectors (402-404) controlled by the channel selection algorithm (401). The channel detection algorithm (401) is illustrated in FIG. 5. The first detector (402) of the alternate embodiment is a DFE. The second detector (403) is a closed loop coherent detector such as a digital decision directed phase lock loop (PLL). A PLL is a common closed loop coherent detector. PLLs are described in LEE AND MESSERSCHMIT, DIGITAL COMMUNICATIONS, Chapters 13 and 14 (1988). The third detector (404) is an instantaneous carrier estimate detector. This detector uses the phase difference between its output at $t=(n-1)$ and the symbol decision at $t=(n-1)$ as the demodulation phase at $t=n$.

As in the preferred embodiment, the channel selection algorithm in the alternate embodiment selects the appropriate detector based on the measured channel conditions. A channel sounding (501), that is performing a correlation to obtain an estimate of the symbol-rate sampled channel impulse response, $\{h(n)\}$, is done when a sync sequence (201 and 202) is received. The elements of $\{h(n)\}$, $h(0)$, $h(-1)$, $h(1)$, etc., indicate whether delay spread distortion is present and therefore whether equalization is necessary. An initial selection (502), between detectors (402) and (403), is next done based on if $|h(n)| \leq |h(0)| \forall n \neq 0$ where k is a small positive constant that allows tolerances of small inaccuracies in the estimate of $\{h(n)\}$. These inaccuracies come mainly from the noise in the receiver. If no noise is present in the received signal, k=0. To allow for noise in the estimate of $\{h(n)\}$, k is set to a small positive constant such as 0.05 or 0.10. The exact value chosen for k depends on the aspects of the specific system, such as sync sequence length and expected range of signal to noise ratios.

If the above expression is true, detector (403) is selected, otherwise detector (402) is selected. Detector (404) is not considered for initial selection because detector (403) performs better in the majority of non-delay spread distortion channels and detector (402) is chosen for delay spread channels.

After the initial selection, each detector in the alternate embodiment is allowed to accumulate a QPSK constellation correlation histroy over nblock symbols (503). nblock is the number of times that the $R_n^{(i)}$ equation is updated (after the sync sequence) before a detector switch is allowed. Since $R_n^{(i)}$ is reset to zero at the beginning of each new time slot, nblock samples must be accumulated to average out any noise or distortion. In other words, $R_n^{(i)}$ is an exponentially windowed average constellation correlation and samples must be accumulated before the average can be valid. The value of nblock would typically be determined by how rapidly the channel is changing, this could be in the range of 15 to 30. After nblock symbols, the best detector output is selected at every symbol time based on the magnitude of the constellation correlations.

The constellation correlation, R, is computed according to the recursive, exponentially weighted correlation equation:

$$R_n^{(i)} = \lambda R_{n-1}^{(i)} + e^{j\theta r_i^i} e^{-j\theta d}$$

where:
n=symbol number (n=1 is the first symbol after sync sequence);
$\lambda$=memory coefficient, $0<\lambda \leq 1$;
i=detector number (1-3 in this embodiment);
$\theta_r^i$=phase of the output of detector i at time n;
$\theta_d$=phase of the decision at time n.

The detector (402-404) having the largest constellation correlation at the current symbol time is selected (504) as an input to the decision device (405) that quantizes the signal to the nearest valid QPSK constellation point. The output of the decision device (405) is fed back to the detectors (402-404) for updating the valid constellation points (505). The above described process is repeated for each received sync sequence (201 and 202).

The two different correlation methods discussed above may be used interchangeably between the preferred and alternate embodiments. The preferred embodiment correlation method is the rectangular window method while the alternate embodiment discussion teaches the exponentially decaying window method. The exponential window method tracks channel variations by using an exponentially decaying, continuous window. The rectangular window method tracks channel variations by dividing the time slot into smaller sub-blocks and uses a rectangular window for averaging over these sub-blocks.

Figure 7:
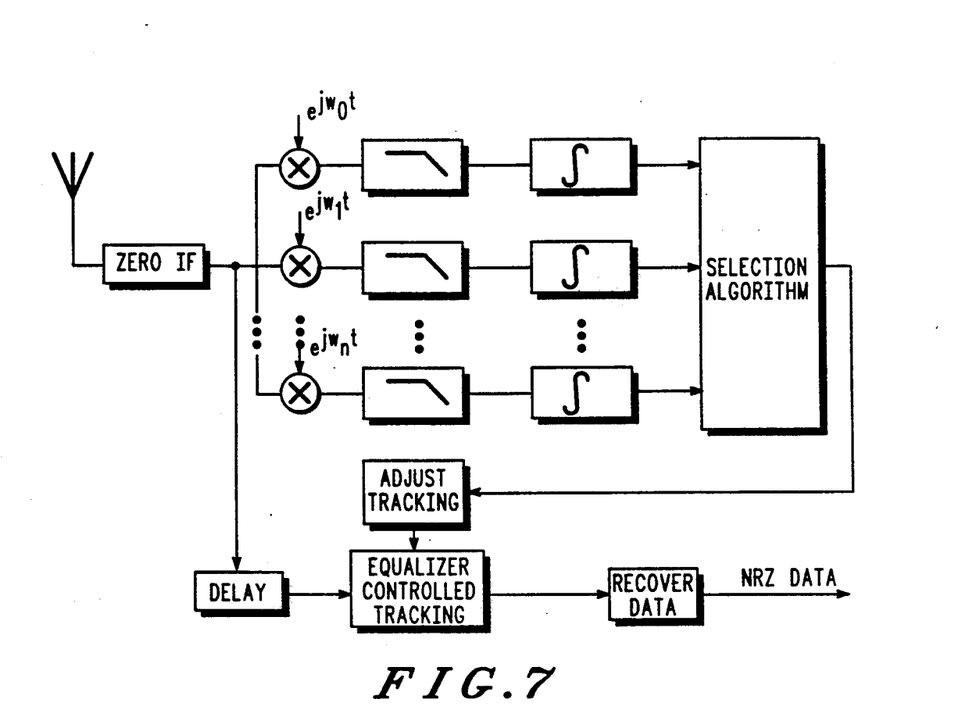
FIGS. 7-13 show other alternate embodiments of the present invention.

Other alternate embodiments of the present invention are based on different measurement criteria of the channel. A first of these alternate embodiments is illustrated in FIG. 7. This is a frequency spectrum method based on the identification of a spectral null with the band. The data modulation is assumed to be random noise that generates a flat spectra across the channel frequency band. In a Rayleigh fading channel, the whole spectrum across the band is attenuated. In a delay spread channel, however, certain regions of the spectrum are attenuated and will show a notch. The short term spectra calculation is used to identify the channel conditions to activate the equalizer. The implementation of the frequency spectrum calculation can be based on a Fast Fourier Transform approach or a filter bank implementation.

Figure 8:
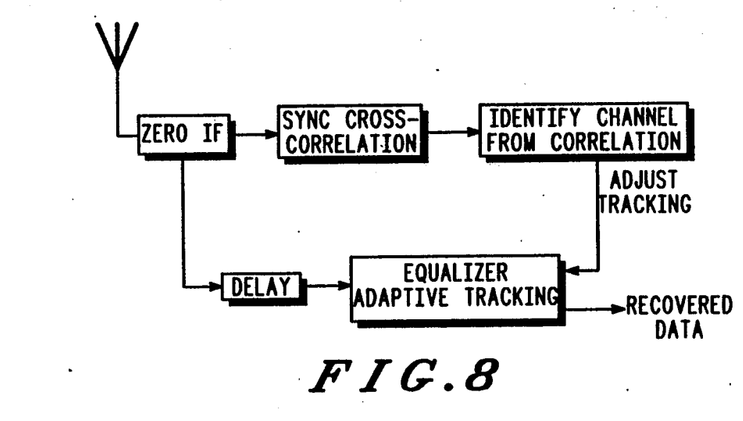

Another alternate embodiment is illustrated in FIG. 8. This embodiment uses the sync word to identify the channel. The complex correlation of the received data with a sync defines the channel impulse response that can be used to identify the channel. This embodiment can be used to perform a single snapshot identification since the sync word is only present at the beginning of the TDM frame.

Figure 9:
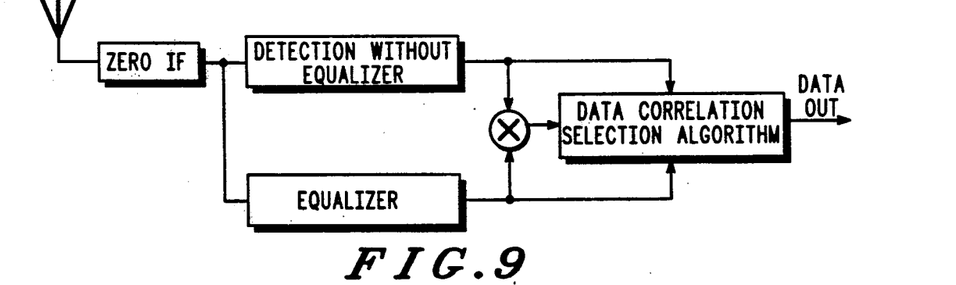

Still another alternate embodiment of the present invention is illustrated in FIG. 9. This embodiment makes a selection decision based on:

$$C_{de}(t) = E\{v_d(t)v_e(t)\}$$

where $C_{de}$ is the cross-correlation function between the coherent detector and the equalizer. If the correlation is above some threshold, then both detectors are performing well (implying flat Rayleigh fading) and the coherent detector should be chosen. Otherwise, the channel is probably a delay spread channel and the equalizer should be chosen.

Figure 10:
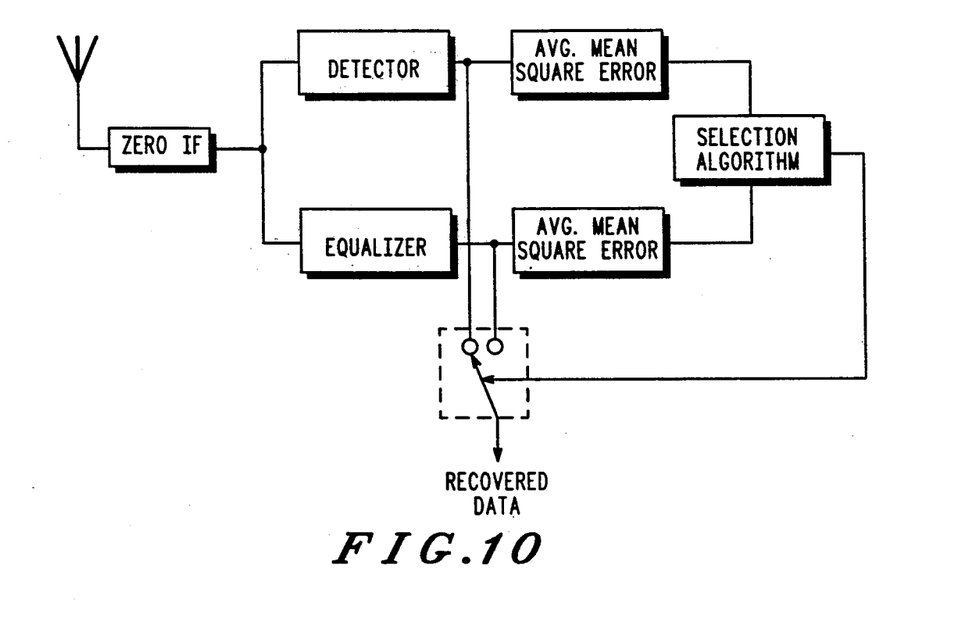

Still another alternate embodiment of the present invention, illustrated in FIG. 10, uses the mean square error output from both detectors to identify the channel. The correlation approach is applied to identify signal quality. The detector with the highest quality is used for the data detection. This embodiment is sensitive to received RF signal level since the level will be reflected in the error signal. A form of normalization or automatic gain control can be used to reduce the level dependance.

Figure 11:
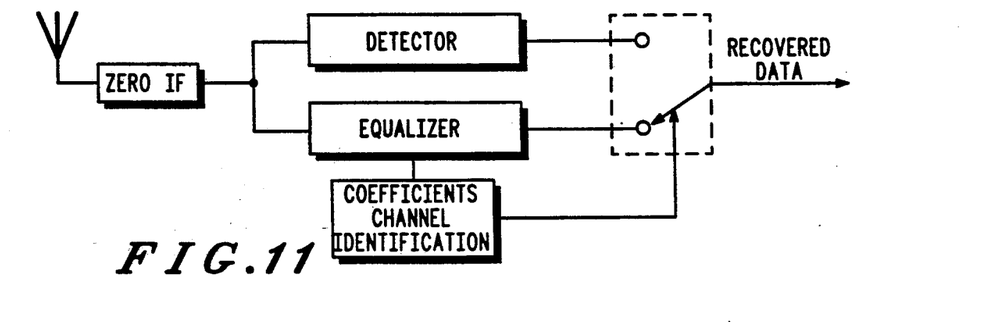

The DFE equalizer coefficients can be used to identify the channel in another embodiment of the present invention, illustrated in FIG. 11. This embodiment requires extensive pattern matching to define the channel type from a wide range of possible coefficient values. RF levels will be reflected in the coefficients.

Figure 12:
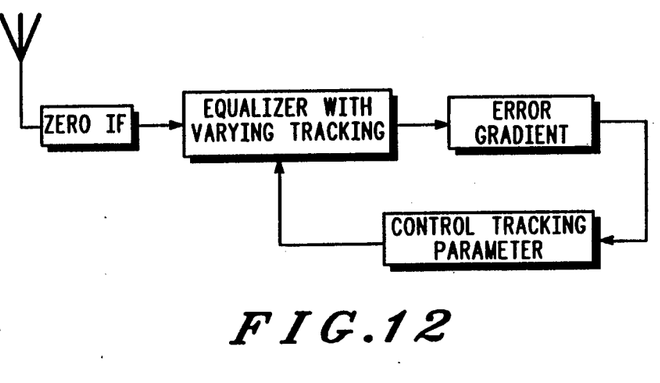

Another embodiment of the present invention, illustrated in FIG. 12, adjusts the memory coefficient of the equalizer to different values in a Rayleigh and delay spread channel. The memory coefficient in the equalizer structure determines the tracking performance of the equalizer; a value closer to unity is desirable for operation in a Rayleigh channel. A lower value, however, is needed for tracking the dynamic delay spread channel.

Figure 13:
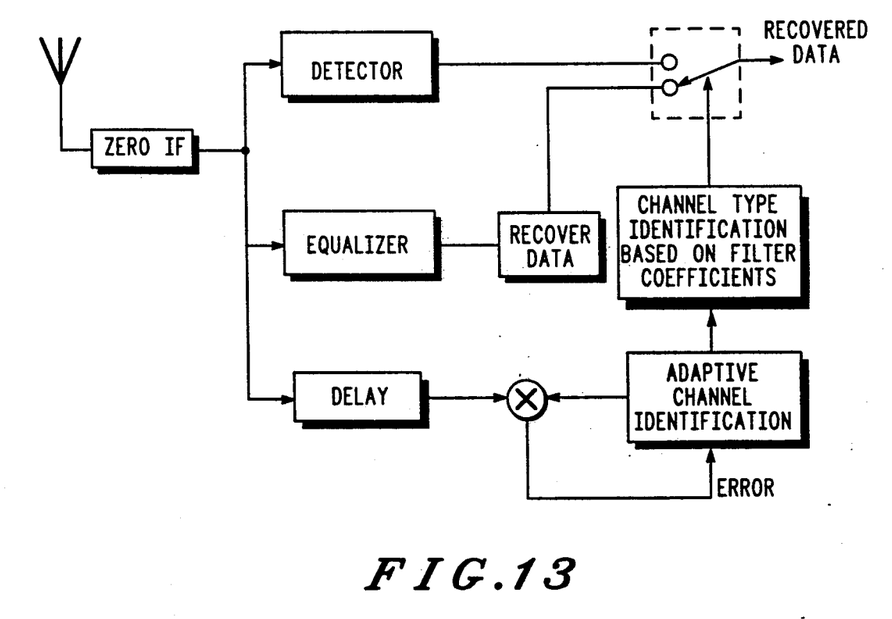

FIG. 13 illustrates another alternate embodiment of the present invention based on channel identification directly. One possible method of identification is to implement a channel estimation based on the LMS or any other type of adaptive algorithm to identify the channel.

Figure 6:
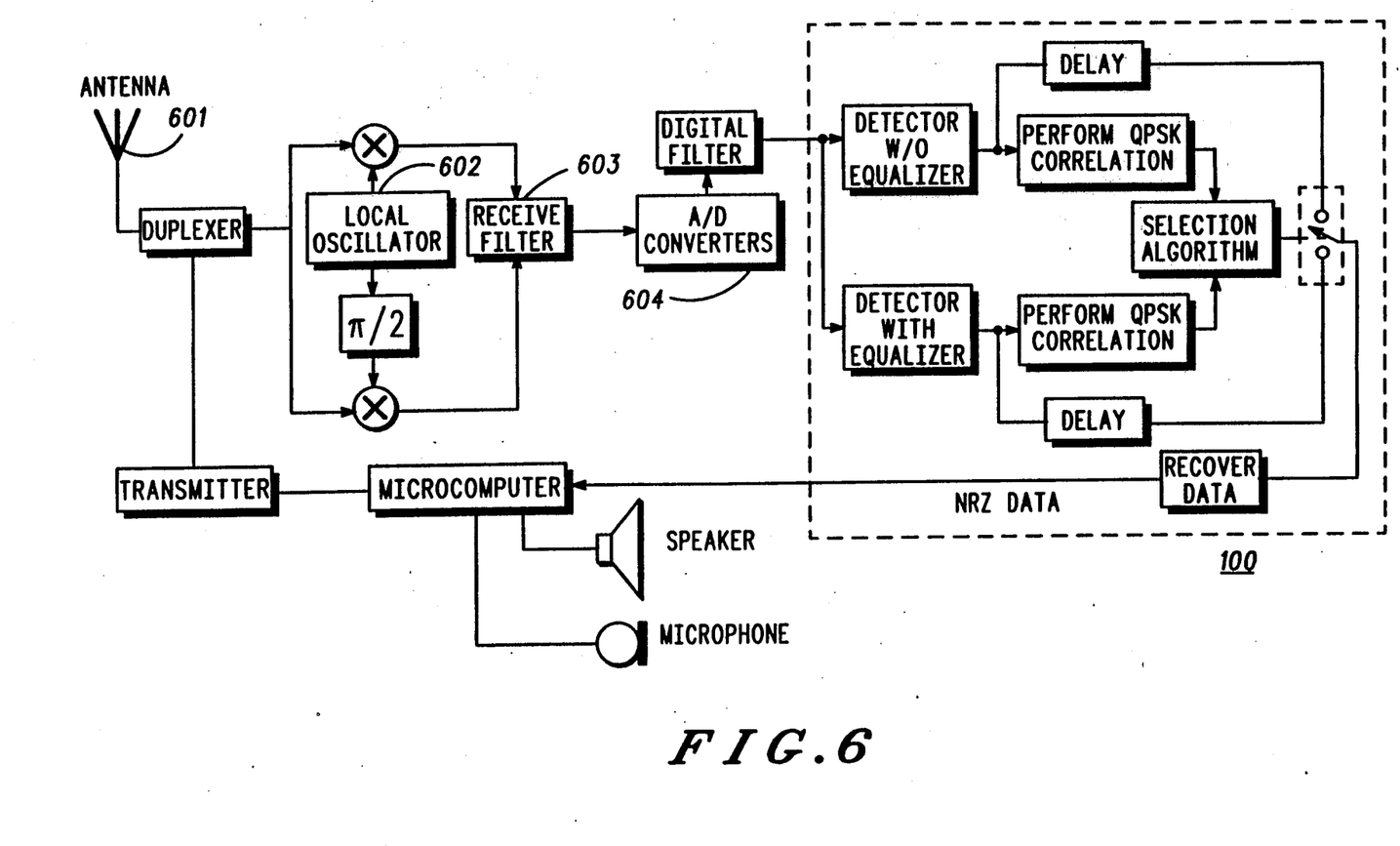
FIG. 6 shows a typical application of the preferred embodiment of the present invention in a radiotelephone.

FIG. 6 shows the present invention as used in a typical application, such as a radiotelephone. The signal is received by the antenna (601) and is mixed to baseband by the local oscillator (602) and filtered by the receive filter (603). This signal is then sampled and converted to a digital stream of data by the Analog to Digital (A/D) converter (604). The coherent detectors and selection algorithm (100) of the present invention then processes the data as described above.

Although a QPSK detection algorithm is the preferred embodiment of the present invention, the present invention will work with any modulation method. In summary, the present invention enables adaptive switching between an equalizer and a coherent detector or detectors to recover data from a received signal. The switching is accomplished dynamically, depending on whether the receiver is in a delay spread distortion environment, as the signal is received.

We claim:
1. A method for adaptive detection/equalization of radio frequency communication channels, over which a plurality of symbols are transmitted, in a communication device having a detection algorithm without an equalizer and a detection algorithm with an equalizer, the detection algorithms generating data for use by the communication device, the method comprising the steps of:
   a) measuring a first correlation history for the detection algorithm without the equalizer;
   b) measuring a second correlation history for the detection algorithm with the equalizer;
   c) if the first correlation history is greater than a predetermined threshold, using the data from the detection algorithm without the equalizer;
   d) if the first correlation history is less than or equal to the predetermined threshold and less than the second correlation history, using the data from the detection algorithm with the equalizer; and
   e) if the first correlation history is less than or equal to the predetermined threshold and greater than or equal to the second correlation history, using the data from the detection algorithm without the equalizer.

2. A method for adaptive detection/equalization of radio frequency communication channels, over which a plurality of symbols are transmitted, in a communication device having a plurality of detection algorithms, the method comprising the steps of:
   a) estimating a symbol-rate sampled channel impulse response, $\{h(n)\}$;
   b) selecting a first detection algorithm in response to the values of $\{h(n)\}$;
   c) building a correlation history, for a predetermined number of symbols, for each of the plurality of detection algorithms;
   d) selecting a second detection algorithm in response to the value of the correlation history;
   e) updating the correlation history; and
   f) repeating from step d.

3. A method for adaptive detection/equalization of radio frequency communication channels, over which a plurality of symbols are transmitted, in a communication device having a plurality of detection algorithms without an equalizer and a detection algorithm with an equalizer, the detection algorithms generating data for use by the communication device, the method comprising the steps of:
   a) measuring a correlation history for each of the detection algorithms without the equalizer;
   b) measuring a correlation history for the detection algorithm with the equalizer;
   c) if each of the correlations for the detection algorithms without the equalizer is greater than a predetermined threshold, using the data from a first detection algorithm without the equalizer having the largest correlation history;
   d) if each of the correlations for the detection algorithms without the equalizer is less than or equal to the predetermined threshold and less than the correlation history for the detection algorithm with the equalizer, using the data from the detection algorithm with the equalizer; and
   e) if each of the correlations for the detection algorithms without the equalizer is less than or equal to the predetermined threshold and greater than or equal to the correlation history for the detection algorithm with the equalizer, using the data from the detection algorithm without the equalizer.

4. A method for adaptive detection/equalization of radio frequency communication channels, over which a plurality of symbols are transmitted, in a communication device having a plurality of detection algorithms without an equalizer and a detection algorithm with an equalizer, the detection algorithms generating data for use by the communication device, the method comprising the steps of:
   a) measuring a power spectrum in a radio frequency communication channel;
   b) if the power spectrum is uniform, using the data from the detection algorithm without the equalizer; and
   c) if the power spectrum is not uniform, using the data from the detection algorithm with the equalizer.

5. The method of claim 4 wherein the power spectrum is measured using a Fast Fourier Transform.

6. A method for adaptive detection/equalization of radio frequency communication channels, over which a plurality of symbols are transmitted, in a communication device having a plurality of detection algorithms without an equalizer and a detection algorithm with an equalizer, the detection algorithms generating data for use by the communication device, the method comprising the steps of:
   a) measuring a power spectrum in a plurality of filtering means;
   b) comparing a first filtering means with a second filtering means to determine uniformity of the power spectrum among the plurality of filtering means;
   c) if the power spectrum is uniform, using the data from the detection algorithm without the equalizer; and
   d) if the power spectrum is not uniform, using the data from the detection algorithm with the equalizer.

7. The method of claim 6 wherein the power spectrum is measured using a Fast Fourier Transform.

8. A method for adaptive detection/equalization of radio frequency communication channels, over which a plurality of symbols are transmitted, in a communication device having at least one equalizer that varies performance in response to a memory coefficient, the method comprising the steps of:
   a) performing a correlation to estimate a symbol-rate sampled channel impulse response, $\{h(n)\}$;
   b) selecting a memory coefficient in response to the values of $\{h(n)\}$; and
   c) using the selected memory coefficient to vary tracking of an equalizer algorithm to equalize the radio frequency communication channels.

9. A method for adaptive detection/equalization of radio frequency communication channels, over which a plurality of symbols are transmitted, in a communication device having a detection algorithm without an equalizer and a detection algorithm with an equalizer, the detection algorithms generating data for use by the communication device, the method comprising the steps of:
   a) measuring a first correlation history for the detection algorithm without the equalizer;
   b) measuring a second correlation history for the detection algorithm with the equalizer;
   c) if the first correlation history is greater than or equal to the second correlation, using the data from the detection algorithm without the equalizer; and
   d) if the first correlation history is less than the second correlation history, using the data from the detection algorithm with the equalizer.

10. A method for adaptive detection/equalization of radio frequency communication channels, over which a plurality of symbols are transmitted, in a communication device having a detection algorithm without an equalizer and a detection algorithm with an equalizer, the detection algorithms generating data for use by the communication device, the method comprising the steps of:
   a) measuring a first average mean square error for the detection algorithm without the equalizer;
   b) measuring a second average mean square error for the detection algorithm with the equalizer;
   c) if the first average mean square error is less than or equal to the second average mean square error, using the data from the detection algorithm without the equalizer; and
   d) if the first average means square error is greater than the second average mean square error, using the data from the detection algorithm with the equalizer.

11. A method for adaptive detection/equalization of radio frequency communication channels, over which a plurality of symbols are transmitted, in a communication device having a plurality of detection algorithms without an equalizer and a detection algorithm with an equalizer comprised of filter coefficients, the detection algorithms generating data for use by the communication device, the method comprising the steps of:
   a) determining a quantity of substantially non-zero equalizer filter coefficients;
   b) if the quantity of substantially non-zero equalizer filter coefficients is greater than a predetermined threshold, using the data from the detection algorithm with the equalizer; and
   c) if the quantity of substantially non-zero equalizer filter coefficients is less than or equal to the predetermined threshold, using the data from the detection algorithm without the equalizer.

12. A method for adaptive detection/equalization of radio frequency communication channels, over which a plurality of symbols are transmitted, in a communication device having an equalization algorithm with an error gradient, the method comprising the steps of:
   a) estimating the equalizer error gradient;
   b) selecting a memory coefficient in response to the value of the equalizer error gradient; and
   c) using the selected memory coefficient to vary tracking of the equalization algorithm.

13. A method for adaptive detection/equalization of radio frequency communication channels, over which a plurality of symbols are transmitted, in a communication device having a plurality of detection algorithms without an equalizer, a detection algorithm with an equalizer, the detection algorithms generating data for use by the communication device, the communication device also comprising means for generating an adaptive channel identification comprised of filter coefficients, the method comprising the steps of:
   a) determining a quantity of substantially non-zero adaptive channel identification filter coefficients;
   b) if the quantity of substantially non-zero adaptive channel identification filter coefficients is greater than a predetermined threshold, using the data from the detection algorithm with the equalizer; and
   c) if the quantity of substantially non-zero adaptive channel identification filter coefficients is less than or equal to the predetermined threshold, using the data from the detection algorithm without the equalizer.

14. A method for adaptive detection/equalization of radio frequency communication channels, over which a plurality of symbols are transmitted, in a communication device having an equalization algorithm comprised of a plurality of filter coefficients, the method comprising the steps of:
   a) estimating a symbol-rate sampled channel impulse response, $\{h(n)\}$;
   b) varying the number of filter coefficients in the equalization algorithm in response to the channel impulse response;
   c) selecting a memory coefficient in response to the value of $\{h(n)\}$; and
   d) using the memory coefficient to vary tracking of the equalization algorithm.

15. A method for adaptive detection/equalization of radio frequency communication channels, over which a plurality of symbols are transmitted, in a communication device having an equalization algorithm comprised of a plurality of filter coefficients, the method comprising the steps of:
   a) performing a correlation to estimate a symbol-rate sampled channel impulse response, $\{h(n)\}$; and
   b) varying the number of filter coefficients in the equalization algorithm in response to the estimated channel impulse response in order to adaptively equalize the radio frequency communication channels.

16. A method for adaptive detection/equalization of radio frequency communication channels, over which a plurality of symbols are transmitted, in a communication device having a detection algorithm without an equalizer and a detection algorithm with an equalizer, the detection algorithms generating data for use by the communication device, the method comprising the steps of:
   a) measuring a cross correlation between the detection algorithm without the equalizer and the detection algorithm with the equalizer;
   b) if the cross correlation is greater than or equal to a predetermined threshold, using the data from the detection algorithm without the equalizer; and
   d) if the cross correlation is less than the predetermined threshold, using the data from the detection algorithm with the equalizer.

17. The method of claim 16 wherein the predetermined threshold is 0.95.

18. A method for adaptive detection/equalization of radio frequency communication channels, over which a plurality of symbols are transmitted, in a communication device having a plurality of detection algorithms without an equalizer and a detection algorithm with an equalizer comprised of filter coefficients, the detection algorithms generating data for use by the communication device, the method comprising the steps of:
   a) determining equalizer filter coefficients;
   b) comparing equalizer filter coefficients to predetermined patterns that represent channels with and without distortion;
   c) if the filter coefficients represent a channel with distortion, selecting the detector with the equalizer; and
   d) if the filter coefficients represent a channel without distortion, selecting the detector without the equalizer.

19. A method for adaptive detection/equalization of radio frequency communication channels, over which a plurality of symbols are transmitted, in a communication device having a plurality of detection algorithms without an equalizer and a detection algorithm with an equalizer comprised of filter coefficients, the detection algorithms generating data for use by the communication device, the method comprising the steps of:
   a) determining adaptive channel identification filter coefficients;
   b) comparing adaptive channel identification filter coefficients to predetermined patterns that represent channels with and without distortion;
   c) if the filter coefficients represent a channel with distortion, selecting the detector with the equalizer; and
   d) if the filter coefficients represent a channel without distortion, selecting the detector without the equalizer.

20. A method for adaptive detection/equalization of radio frequency communication channels, over which a plurality of symbols are transmitted, in a communication device having a detection algorithm without an equalizer and a detection algorithm with an equalizer, the detection algorithms generating data for use by the communication device, the method comprising the steps of:
   a) measuring a first correlation history for the detection algorithm without the equalizer;
   b) measuring a second correlation history for the detection algorithm with the equalizer;
   c) comparing correlation histories to predetermined patterns that represent channels with and without distortion;
   d) if the first correlation history represents a channel with distortion, selecting the detector with the equalizer; and
   e) if the first correlation history represents a channel without distortion, selecting the detector without the equalizer.

* * * * *